United States Patent
Hady et al.

(10) Patent No.: US 6,687,821 B1
(45) Date of Patent: Feb. 3, 2004

(54) SYSTEM FOR DYNAMICALLY CONFIGURING SYSTEM LOGIC DEVICE COUPLED TO THE MICROPROCESSOR TO OPTIMIZE APPLICATION PERFORMANCE BY READING FROM SELECTION TABLE LOCATED IN NON-VOLATILE MEMORY

(75) Inventors: Frank T. Hady, Portland, OR (US); Mason B. Cabot, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/541,381

(22) Filed: Mar. 31, 2000

(51) Int. Cl.$^7$ .................................................. G06F 9/00
(52) U.S. Cl. ........................ 713/100; 710/113; 710/116; 712/43
(58) Field of Search ................................ 710/113, 116; 713/100; 712/43

(56) References Cited

U.S. PATENT DOCUMENTS

| | | | | |
|---|---|---|---|---|
| 5,546,548 A | * | 8/1996 | Chen et al. | 710/116 |
| 5,802,330 A | * | 9/1998 | Dutton | 710/116 |
| 5,915,102 A | * | 6/1999 | Chin | 710/113 |
| 5,983,302 A | * | 11/1999 | Christiansen et al. | 710/113 |
| 6,052,134 A | * | 4/2000 | Foster | 345/533 |
| 6,185,647 B1 | * | 2/2001 | Shibuya | 710/107 |
| 6,205,537 B1 | * | 3/2001 | Albonesi | 712/43 |
| 6,370,624 B1 | * | 4/2002 | Ajanovic et al. | 711/149 |

* cited by examiner

Primary Examiner—Thomas Lee
Assistant Examiner—Albert Wang
(74) Attorney, Agent, or Firm—Calvin E. Wells

(57) ABSTRACT

An example embodiment of a method and apparatus for dynamically changing computer system configuration to improve software application performance includes a system logic device that implements at least two different configurations. The system logic device may change configuration depending on what software application is running. The system logic device can change configurations while the computer system is running and may change configurations in order to optimize performance for whatever application is currently running.

4 Claims, 2 Drawing Sheets

SYSTEM FOR DYNAMICALLY CONFIGURING SYSTEM LOGIC DEVICE COUPLED TO THE MICROPROCESSOR TO OPTIMIZE APPLICATION PERFORMANCE BY READING FROM SELECTION TABLE LOCATED IN NON-VOLATILE MEMORY

FIELD OF THE INVENTION

The present invention pertains to the field of computer systems. More particularly, this invention pertains to the field of dynamically changing computer system configuration to improve application performance.

BACKGROUND OF THE INVENTION

Different types of computer software applications use computer system components in different ways. For example, 3D graphics applications feature significant concurrent traffic to main memory from both the graphics controller and the processor. Business applications may result in a great deal of processor to main memory traffic. Some applications may feature excellent main memory locality while others may result in poor main memory locality.

Designers of prior computer systems have sought to produce computer systems that work acceptably well for all applications. In doing so, design choices are made that result in computer systems that are not optimized for any particular software application.

Some prior computer system components have programmable features that allow some amount of customization. However, these features are typically programmed during the computer system boot-up process. Once the computer system component features are programmed at boot-up time, the computer system configuration remains unchanged during computer system operation.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

An example embodiment of a method and apparatus for dynamically changing computer system configuration to improve software application performance includes a system logic device that implements at least two different configurations. The system logic device may change configuration depending on what software application is running. The system logic device can change configurations while the computer system is running and may change configurations in order to optimize performance for whatever application is currently running.

Figure 1:
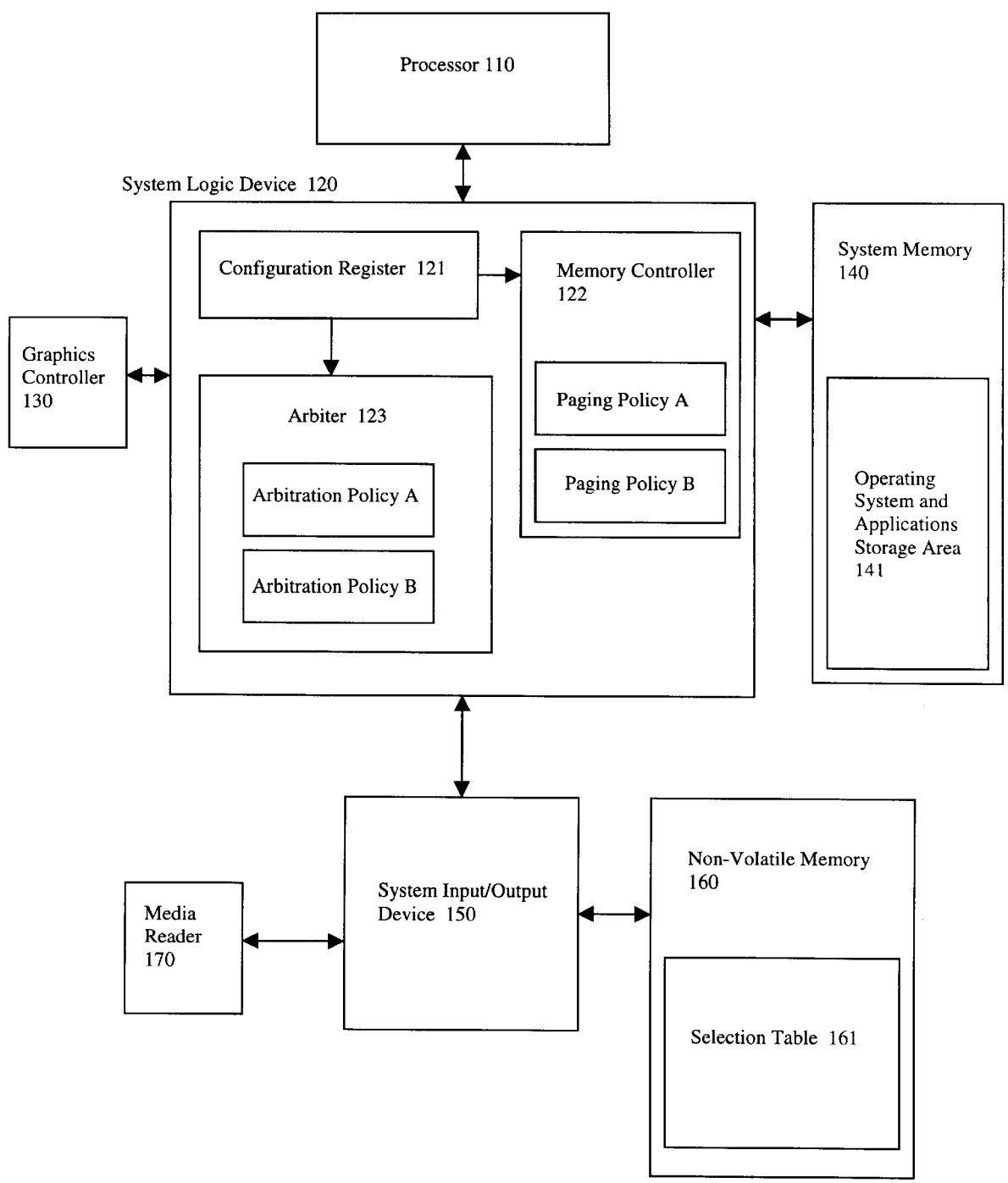
FIG. 1 is a block diagram of a computer system including a system logic device implemented in accordance with an embodiment of the invention.

FIG. 1 is a block diagram of a computer system including a system logic device 120 that can change its configuration depending on what software application is running on a processor 110 that is coupled to the system logic device 120. Also included in the system of FIG. 1 is a system memory 140 and a graphics controller 130, each coupled to the system logic device 120. The system of FIG. 1 further includes a system input/output device 150 that is coupled to the system logic device 120 and is further coupled to a non-volatile memory 160 and a media reader 170.

The system logic device 120 includes a configuration register 121, an arbiter 123, and a memory controller 122. The arbiter 123 is capable of operating in one of two modes, represented by arbitration policy A and arbitration policy B. The memory controller 122 is also capable of operating in one of two modes, represented by paging policy A and paging policy B. Whether the arbiter 123 uses arbitration policy A or arbitration policy B is determined by the contents of the configuration register 121. Similarly, whether the memory controller 122 uses paging policy A or paging policy B is also determined by the contents of the configuration register 121. The memory controller 122 and the arbiter 123 are capable of switching from one policy to the other while the computer system is running applications. By being able to switch between modes of operation while the system is running applications, the system logic device 120 can be optimized for whichever application is currently running, thereby maximizing performance for that application.

When a software application is launched, it is first read by the processor 110 from an operating system and applications storage area 141 located in system memory 140. A monitoring applet or other software agent detects that an application is being started and causes the processor 110 to determine which application is being started. The processor 110 then accesses a selection table 161 located in the non-volatile memory 160. The selection table 161 contains system logic device configuration information for many applications. The processor 110 accesses the configuration information corresponding to the recently launched application and performs a write cycle to the configuration register 121 within the system logic device 120. The arbiter 123 and the memory controller 122 are notified of the write to the configuration register 121 and the arbiter 123 and the memory controller 122 change arbitration and paging policies if necessary.

The selection table 161 may contain configuration data for a large number of software applications. Each application may be pre-analyzed in order to discover the best performing system configuration for each application. The configuration data may be initially loaded into the non-volatile memory during the system manufacturing process. Updates to the selection table may be made available to end users, perhaps via the Internet. The updates to the selection table may contain configuration information for newly analyzed applications or may make changes to the configuration information for previously analyzed applications.

Arbitration policy A may optimize the arbiter 123 for 3D graphics applications to make sure that the graphics controller 120 and the processor 110 receive adequate memory bandwidth. Arbitration policy B may optimize the arbiter 123 for applications that perform best with a minimum of latency between the processor 110 and the system memory 140. Other arbitration optimizations are possible.

Paging policy A may optimize the memory controller 122 for applications that keep memory pages open while paging policy B may optimize the memory controller 122 for applications that aggressively close memory pages. Other memory paging optimizations are possible.

Further, although this example embodiment mentions arbitration and memory paging configuration options, other configuration options are possible, including, but not limited to, options involving data buffering, memory data prefetching, memory refreshing, and address re-mapping. Further, the memory controller and arbiter may include more than two configuration possibilities.

Also, although this example embodiment mentions configuration options within the system logic device 120, other embodiments are possible where the configuration options reside in other system components.

Rather than relying on a monitoring applet or other software agent to determine which application is running, other embodiments are possible where the system logic device 120 or other system agent uses counters and/or timers to track application behavior. For example, the system logic device 120 may use a counter to track memory pre-fetch hit and/or miss rates and adjust the system configuration accordingly. Similarly, the system logic device 120 may use counters or timers to determine the amount of data traffic flowing to and from the graphics device 130 and adjust the configuration accordingly. Other types of optimizations are possible.

Figure 2:
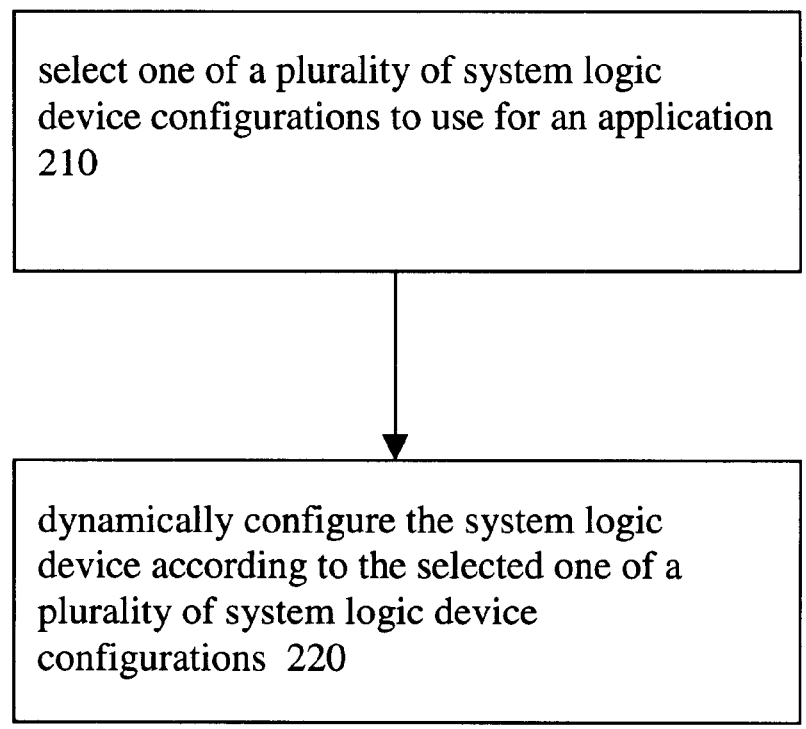
FIG. 2 is a flow diagram of a method for dynamically changing computer system configuration in accordance with an embodiment of the invention.

FIG. 2 is a flow diagram of an embodiment of a method for dynamically changing a system configuration to improve software application performance. At block 210, one of a plurality of system logic device configurations is selected for use with an application. At block 220, the system logic device is dynamically configured according to the system logic device configuration selected at block 210. The above blocks may be repeated for as additional applications are run.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. A system, comprising:

a microprocessor;

a non-volatile memory device to store a plurality of configuration information entries; and a system logic device coupled to the microprocessor, the system logic device including
  a configuration register to store a value read from one of the plurality of configuration information entries stored in a selection table located in the non-volatile memory device, and
  an arbiter including a plurality of arbitration policies, the arbiter to use one of the arbitration policies according to the value stored in the configuration register, the arbiter to dynamically change arbitration policies in response to a change in the value stored in the configuration register.

2. The system of claim 1, the value stored in the configuration register to change in response to an application running on the microprocessor.

3. A system, comprising:

a microprocessor;

a memory device;

a non-volatile memory device to store a plurality of configuration information entries; and a system logic device coupled between the microprocessor and the memory device, the system logic device including
  a configuration register to store a value read from one of the plurality of configuration information entries stored in a selection table located in the non-volatile memory device, and
  a memory controller including a plurality of paging policies, the memory controller to use one of the paging policies according to the value stored in the configuration register, the memory controller to dynamically change paging policies in response to a change in the value stored in the configuration register.

4. The system of claim 3, the value stored in the configuration register to change in response to an application running on the microprocessor.

* * * * *